US008861493B2

(12) United States Patent
Patanapongpibul et al.

(10) Patent No.: US 8,861,493 B2
(45) Date of Patent: Oct. 14, 2014

(54) OPERATING BAND SUPPORT FOR A WIRELESS LOCAL AREA NETWORK

(75) Inventors: Leo Patanapongpibul, Berkshire (GB); Assen Golaup, Berkshire (GB)

(73) Assignee: Vodafone IP Licensing Limited, Berkshire (GB)

( * ) Notice: Subject to any disclaimer, the term of this patent is extended or adjusted under 35 U.S.C. 154(b) by 168 days.

(21) Appl. No.: 13/463,016

(22) Filed: May 3, 2012

(65) Prior Publication Data

US 2012/0300759 A1 Nov. 29, 2012

(30) Foreign Application Priority Data

May 27, 2011 (GB) .................................. 1109016.4
Jun. 7, 2011 (GB) .................................. 1109475.2
Oct. 18, 2011 (GB) .................................. 1117966.0
Apr. 5, 2012 (GB) .................................. 1206180.0

(51) Int. Cl.
*H04W 4/00* (2009.01)
*H04W 48/14* (2009.01)
*H04W 84/12* (2009.01)
*H04W 48/12* (2009.01)

(52) U.S. Cl.
CPC .............. *H04W 48/14* (2013.01); *H04W 84/12* (2013.01); *H04W 48/12* (2013.01)
USPC ........................................................ 370/338

(58) Field of Classification Search
CPC .............................. H04W 48/20; H04W 84/12
See application file for complete search history.

(56) References Cited

U.S. PATENT DOCUMENTS

| 2004/0076134 | A1* | 4/2004 | Barber et al. ................. 370/338 |
| 2006/0073827 | A1* | 4/2006 | Vaisanen et al. .............. 455/436 |
| 2006/0223574 | A1* | 10/2006 | Chandra .................... 455/552.1 |
| 2008/0176568 | A1* | 7/2008 | Palanki et al. ............... 455/436 |
| 2010/0330914 | A1* | 12/2010 | Chandra ........................ 455/62 |
| 2011/0064062 | A1* | 3/2011 | Lee et al. ...................... 370/338 |
| 2011/0261797 | A1* | 10/2011 | Yamaguchi .................. 370/338 |

FOREIGN PATENT DOCUMENTS

| WO | WO 2004/057899 | 7/2004 |
| WO | WO 2006/107698 | 10/2006 |

OTHER PUBLICATIONS

Extended European Search Report dated Jul. 9, 2012 (8 pages).
Leo Patanapongpibul: "Supported Operating Band", Jul. 1, 2011, IEEE 802.11-11/1064r0, pp. 1-3.

* cited by examiner

*Primary Examiner* — Clemence Han
(74) *Attorney, Agent, or Firm* — Kratz, Quintos & Hanson, LLP

(57) ABSTRACT

In Wireless Local Area Network, WLAN, systems, an access point supports access using one or more frequency bands. A WLAN device transmits a query to a WLAN access point prior to association of the WLAN device with the WLAN access point, requesting an indication of one or more frequency bands used by the WLAN access point to support access. The WLAN access point receives the query from the wireless device using one of the one or more frequency bands and transmits to the wireless device an indication of the one or more frequency bands in response. A relative priority of frequency bands may be provided in order to guide the WLAN device in choosing a preferred frequency band.

14 Claims, 1 Drawing Sheet

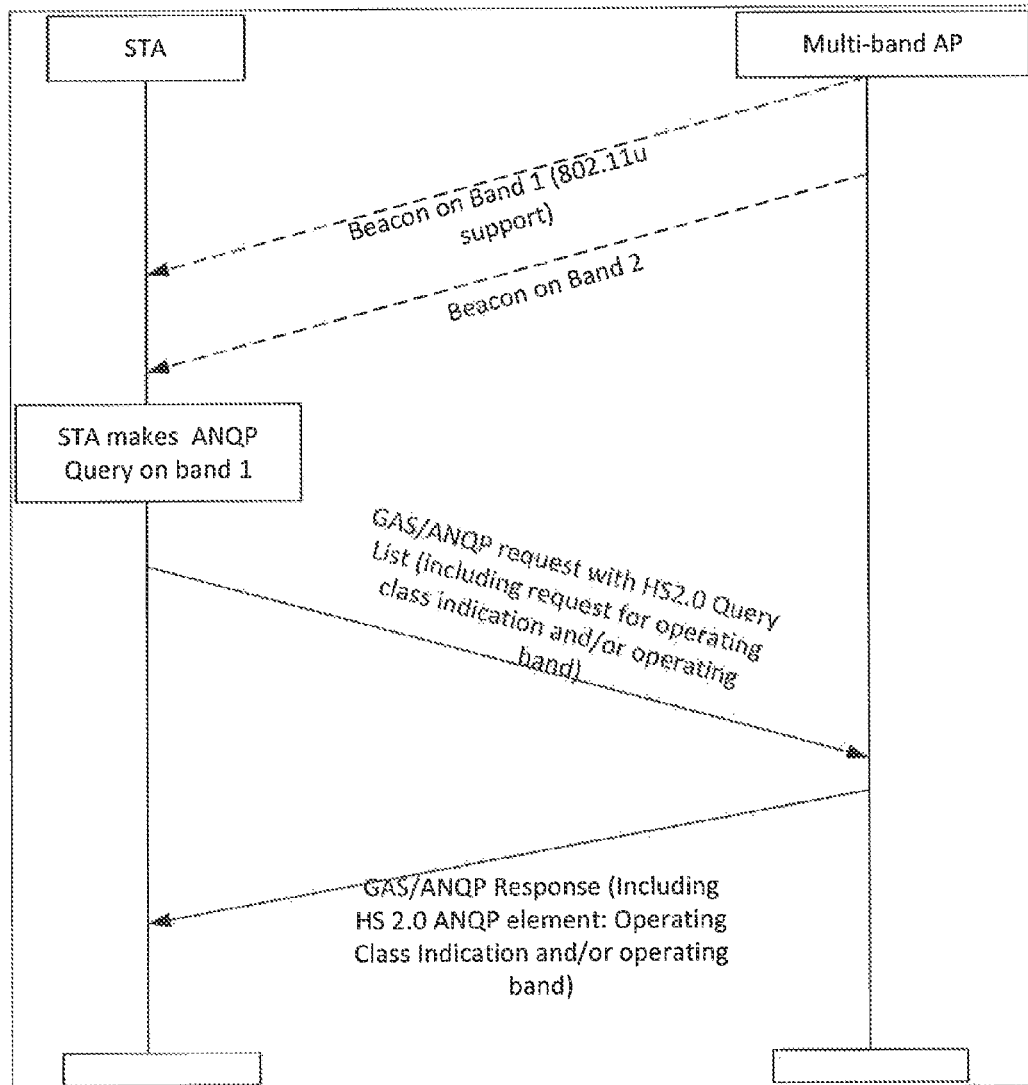

OPERATING BAND SUPPORT FOR A WIRELESS LOCAL AREA NETWORK

TECHNICAL FIELD OF THE INVENTION

The invention relates to a Wireless Local Area Network (WLAN) access point, a WLAN device, and methods of operating a WLAN access point or a WLAN device.

BACKGROUND TO THE INVENTION

A Wireless Local Area Network (WLAN) typically comprises at least one Access Point (AP) and one or more WLAN devices, configured to communicate with and connect to the AP wirelessly. The AP then provides a network resource, such as the Internet, to each of the connected WLAN devices.

A commonly used form of WLAN is based on the IEEE 802.11 family of standards. The Wi-Fi Alliance trade association specifies the requirements for interoperability of APs and devices and certifies products meeting those requirements. Although each AP conventionally operates independently from other APs, networks of APs spread across a geographical area have been established, managed by a common network operator, to facilitate easier Internet access with high data rates.

Recent developments mean that APs and WLAN devices can support operation using multiple frequency bands. APs that are operated as part of a network may provide such support to allow operability with a range of different WLAN devices, some of which may support use of only a single frequency band or a small number of frequency bands. The AP transmits beacons using each of the frequency bands that it supports. A WLAN device can only receive the beacon transmitted using one frequency band at any one time to discover the existence of the AP. However, in first generation WLAN systems, the WLAN device may have no knowledge about whether the AP is part of a network, what functionality the AP supports and whether the WLAN device has subscription rights to access the AP prior to association with the Access Point. These features would only become apparent following connection to and authentication by the AP to enable association.

Developments in industry standards, such as IEEE 802.11u, seek to improve the accessibility of AP networks by WLAN devices. This is achieved by introducing new protocols which allow WLAN devices to communicate with an AP or a server of the AP network operator prior to association, than is prior to connection and authentication. The Generic Advertisement Service (GAS) allows link layer communication between a WLAN device and a server of the AP network operator via the AP. The Access Network Query Protocol (ANQP) is a query and response protocol (sometimes termed a pre-association protocol). Using ANQP, a WLAN device can determine basic information about the AP and network of APs that would otherwise have been unavailable prior to connection and authentication. These two protocols are intended to be used together for querying identified APs, thereby allowing the WLAN device to select an AP appropriately.

A challenge in the development of ANQP is ensuring that the WEAN device is provided with useful information about an AP, whilst minimising redundant information that wastes capacity and reduces efficiency. It is therefore desirable that ANQP is limited only to information that the WLAN device can use beneficially in selecting an AP appropriately.

SUMMARY OF THE INVENTION

Against this background and in a first aspect, the present invention provides a Wireless Local Area Network (WLAN) access point, supporting access using one or more frequency bands. The WLAN access point is configured to receive a query from a wireless device using one of the one or more frequency bands prior to association of the wireless device with the WLAN access point and to transmit to the wireless device an indication of the one or more frequency bands in response to the query. Preferably, the query and response use the Access Network Query Protocol (ANQP). Preferably, the Access Point supports access using a plurality of frequency bands. A wireless device may be understood as another term for WLAN device and is typically a client station (STA).

Existing systems require the WLAN device to scan one frequency band at a time, so as to receive the beacon transmitted by the AP on that frequency band prior to association of the STA with the AP. The pre-association period is normally understood as being prior to security authentication and assignment of a link and/or network layer identifier (such as one or more of an Ethernet and IP address) by the AP, network or both. During this period, it is difficult for any wireless devices to obtain any information about the AP, other than what is broadcast in the beacon.

For a WLAN device that also supports multiple frequency bands, it can only query such an AP using one frequency band at a time. Moreover, ANQP may limit the data provided only to information related to the frequency band using which the WLAN device has made the query. This makes it difficult for the WLAN device to make an informed selection of AP and an informed selection of the frequency band on which to connect to that AP, since it remains unaware of the AP functionality in respect of other frequency bands from that using which the WLAN device made its query.

By transmitting an indication of the one or more frequency bands using which the AP supports access, the WLAN device can identify these frequency bands without the need to scan all frequency bands and determine if a beacon can be received. This also minimises the number of steps needed by the WLAN device in making a more informed decision about the frequency band on which it should associate to the AP. Scanning of certain frequency bands (such as 5 GHz) may be particularly power consuming for the device, in view of the large number of channels to scan. Power consumption is especially critical for mobile devices. Moreover, the AP may benefit in a more balanced traffic load by provide WLAN devices with information about the possibility of using alternative frequency bands.

Although the term AP is used, it may be understood that an AP is limited to a single frequency band. In such a case, the term AP as used herein should be understood as referring to a group of access points in the same Extended Service Set (ESS). The frequency band can also be referred to as an Operating Class. For example, a list of Operating Classes is defined in Annex E of IEEE Draft P802.11-REVmb-D12.0, Part 11: Wireless LAN Medium Access Control (MAC) and Physical Layer (PHY) Specifications, November 2011.

In the preferred embodiment, the response is transmitted using the same one of the one or more frequency bands as was used for the query.

The WLAN access point is optionally further configured to transmit a beacon on each of the one or more frequency bands used for supporting access. Alternatively, the WLAN access point may transmit a beacon on one or more than one of the one or more frequency bands used for supporting access. As a further alternative, the WLAN access point may transmit a beacon advertising the presence of the access point as part of a network on none of the one or more frequency bands used for supporting access. For example, it is possible to hide the Service Set Identification (SSID) in the beacon. The beacon is present, so that an STA can find the AP, but excluding the SSID from the beacon may mean that the operator does not advertise the presence of a network in a second or further band.

Advantageously, the invention may allow a multiband AP to advertise the support of frequency bands other than the one using which a WLAN device detected it. As a further optional enhancement, the WLAN Access Point may be further configured to transmit an indication of specific channels (frequency sub-bands) within advertised frequency bands, using which the beacon of the AP is transmitted. This may mitigate the need for the WLAN to scan all channels on the indicated frequency band and thereby reduce power consumption further.

Preferably, the WLAN access point is further configured to transmit a priority indication, indicative of at least one preferred frequency band from the one or more frequency bands used for supporting access. Advantageously, the priority indication is further indicative of a ranking for at least some of the one or more frequency bands, the ranking identifying the relative preferred status for accessing the access point using the respective frequency band. Thus, the AP may respond to the query by indicating one or more preferred frequency bands, to assist or guide a decision of the wireless device about which frequency band to use for access. A ranking may be used to indicate the relative priority of the different bands. In some embodiments, the AP may be configured only to transmit an indication of at least one preferred frequency band from the one or more frequency bands used for supporting access. In other words, only the preferred frequency band or bands are provided in response to the query. The preferred frequency band or bands may be different from the band used by the wireless device to query the AP.

In some embodiments, the priority indication is provided in addition to the indication of the one or more frequency bands transmitted in response to the query. Optionally, the WLAN access point may be configured to transmit the priority indication in response to a second query from the wireless device requesting a priority indication or an indication of a preferred frequency band. In other words, transmitting a priority indication may be made in response to a separate query from the wireless device to the initial query to which the indication of the one or more frequency bands used for supporting access was transmitted in response.

Beneficially, the WLAN access point may be configured to determine the priority indication on the basis of an operational characteristic of the WLAN access point. The operational characteristic may comprise a load upon the WLAN access point in some embodiments. Additionally or alternatively, the operational characteristic may comprise a detected interference level in respect of the one or more frequency bands used for supporting access. This allows the AP to guide the wireless device towards a frequency band which it can use to improve its access to the AP. The wireless device may still have the possibility to decide the frequency band that it uses for accessing the AP. Alternatively, the wireless device may use the preferred frequency band if there is only one, or one of the preferred frequency bands if there is more than one. The wireless device may use the ranking to further enhance a decision.

In further embodiments, the WLAN access point may be configured to determine the priority indication on the basis of a characteristic of the wireless device from which the query is received. Optionally, both the characteristic of the wireless device and the operational characteristic of the WLAN AP may be used, although alternatively only one might be used. Thus, the AP may additionally or alternatively use information about the wireless device, such as subscription information or information about the hardware, software or both of the wireless device to provide preference information that is tailored to the wireless device. To this end, the WLAN access point is optionally further configured to communicate with a database. The database may be configured to store subscription data for a plurality of wireless devices and the characteristic of the wireless device may be determined using subscription data for the wireless device from which the query is received.

The indication of the one or more frequency bands used for supporting access preferably comprises a plurality of indicators. Each of these may be termed an Operating Class Indication Element. Each indicator may identify a respective one of the one or more frequency bands (Operating Class) used for supporting access. The indicator may use the values defined in Annex E of IEEE Draft P802.11-REVmb-D12.0, Part 11: Wireless LAN Medium Access Control (MAC) and Physical Layer (PHY) Specifications, November 2011. Alternatively, the indication of the one or more frequency bands used for supporting access may comprise a single, indicator. The single indicator may identify a specific combination of one or more frequency bands used for supporting access.

In a second aspect, there is provided a Wireless Local Area Network (WLAN) device, configured to transmit a query to a WLAN access point prior to association of the WLAN device with the WLAN access point. The query requests an indication of one or more frequency bands used by the WLAN access point to support access.

Optionally, the WLAN device is further configured to receive a beacon from the WLAN access point using a first frequency band. In this case, the query may be transmitted using the first frequency band, subsequent to reception of the beacon.

In some embodiments, the WLAN device is further configured to receive a priority indication from the WLAN access point. The priority indication may be indicative of at least one preferred frequency band from the one or more frequency bands used by the WLAN access point for supporting access. Then, the WLAN device may be optionally further configured to select a frequency hand based on the received priority indication. It may then be further configured to initiate access to the WLAN access point using the selected frequency band.

It may also be recognised that a WLAN device according to this second aspect may have features to correspond with any of those described in connection with the WLAN AP according to the first aspect.

In a third aspect, there is provided a method of operating a Wireless Local Area Network (WLAN) access point, supporting access using one or more frequency bands. The method comprises; receiving a query from a wireless device using one of the one or more frequency bands prior to association of the wireless device with the WLAN access point; and transmitting to the wireless device an indication of the one or more frequency bands in response to the query. It will be understood that this method can optionally comprise steps or features used to carry out any of the actions described in connection with the WLAN AP detailed above according to the first aspect.

There may be provided in a fourth aspect, a method of operating a Wireless Local Area Network (WLAN) device. The method comprises transmitting a query to a WLAN access point prior to association of the WLAN device with the WLAN access point. The query requests an indication of one or more frequency bands used by the WLAN access point to support access. It will be understood that this method can optionally comprise steps or features used to carry out any of the actions described in connection with the WLAN device detailed above according to the second aspect.

In a yet further aspect, the present invention may be found in one or more of a computer program (such as a connection manager) and an operating system device driver, configured when operated by a processor to carry out any of the methods described herein. Alternatively, the present invention may be embodied in programmable logic, configured upon operation to carry out any of the methods described herein.

Any combination of the individual apparatus features or method features described may also be implemented, even though not explicitly disclosed.

BRIEF DESCRIPTION OF THE DRAWINGS

The invention may be put into practice in various ways, one which will now be described by way of example only and with reference to the accompanying drawing in which:

FIG. 1 shows a communications flow between a WLAN AP and a WLAN device in accordance with an embodiment of the present invention.

DETAILED DESCRIPTION OF PREFERRED EMBODIMENTS

The invention relates to a Multi-band Access Point (AP). Existing access points have used 2.4 GHz, but frequency bands in the area of 5 GHz have become available. Further frequency bands may become available in due course, such as 60 Ghz and television "whitespace". The 5 GHz band has both advantages and drawbacks compared to 2.4 GHz, for example coverage and Dynamic Frequency Selection (DFS) support. However, the migration from 2.4 GHz to 5 GHz presents some benefits for users (increased QoS for some priority stream, load balancing). The availability of the two or more bands with multiband devices opens up more opportunities, assuming the fact that some multiband requirements are fulfilled. Moreover, the existing frequency bands may also be sub-divided into channels, each of which could be considered as a separate frequency band.

More and more access points are available in the market and those which are compatible with IEEE 802.11n are dual band capable, in switchable (2.4 or 5 GHz) or concurrent Band (2.4 and 5 GHz in the same time) mode. Devices supporting dual band are for the moment almost all switchable capable (2.4 or 5 GHz).

A Multi-band Access Point (AP) consists of separated components, one per band without any dialogue between them. The Service Set Identification (SSID) broadcast by the components could be the same or could be different, such that this may appear to the user as separated networks, despite being provided by the same physical Access Point. End-users do not normally understand the concept of frequency bands and, in general, the notion of band, channel or any communication parameters such as rates, should be hidden from the user.

Referring first to FIG. 1, there is shown a communications flow between a WLAN AP (Multi-band AP) and a WLAN device (STA) in accordance with an embodiment of the present invention.

The multi-band AP supports access using two different frequency bands, band 1 (2.4 GHz) and band 2 (5 GHz). It transmits a beacon on both bands 1 and 2. Band 1 typically provides overlay coverage. The beacon on band 1 also indicates that the multi-band AP supports IEEE 802.11u. Both of these beacons are received by the WLAN device STA. The STA then makes a query on band 1 using the access network query protocol (ANQP). This involves the transmission from the STA to the multi-band AP of a generic advertisement service (GAS) message using ANQP. This message is a request that uses a specific query list, in accordance with the Wi-Fi Alliance Passpoint Certified™ query list, which will be described below. This includes a request for an indication of operating class.

The multi-band AP then responds with a GAS/ANQP message that includes an indication of operating class. The operating class identifies the frequency bands that the multi-band AP supports for access. In particular, these are band 1 and band 2 in this example. The STA may then switch to band 2 and begin the security association procedure with the AP belonging to the same operator, without repeating the ANQP/GAS exchange. The STA may be able to identify the AP on band 2 using its beacon, indicating one or more of the following information in the beacon frame: same SSID; same country information; AP is a member of the Multiple Basic SSID (BSSID) set; same Interworking information or same Roaming Consortium information.

As described in IEEE P802.11u-2011, Amendment 9: Interworking with External Networks, the following shows the format of the Passpoint Certified™ ANQP Element, with the length (in octets) of each part of the message underneath. The ANQP Element is the message transmitted between the STA and AP.

| | Info ID | Length | OI | Type | Subtype | Reserved | Payload |
|---|---|---|---|---|---|---|---|
| Octets: | 2 | 2 | 3 | 1 | 1 | 1 | variable |

The Info ID field is a 2-octet field whose value is for the ANQP vendor-specific list (see Table 7-43bk in IEEE P802.11u-2011, Amendment 9: Interworking with External Networks). The Length field is a 2-octet field whose value is set to 6 plus the length of the Payload field. The OI is a 3-octet field and is defined in section 7.3.1.31 of IEEE P802.11p-2010, Amendment 6: Wireless Access in Vehicular Environments. The OI field is set to the value used by the Wi-Fi Alliance. The Type field is a 1-octet field allocated from the Wi-Fi Alliance Technology Identifier Assignments (TIA) number-space to indicate a Passpoint Certified™ ANQP element type. The Subtype field is a 1-octet field whose value identifies the Passpoint Certified™ ANQP element. Values for the Subtype will be discussed below. The Reserved field is a 1-octet field to ensure that the header of the ANQP element is word aligned. The Payload field is a variable length field containing information specific to the Passpoint Certified™ ANQP element.

The following table shows the Subtype Value for each Passpoint Certified™ ANQP Element.

| Element Name | Subtype Value |
|---|---|
| Reserved | 0 |
| HS Query list | 1 |
| HS Capability list | 2 |
| Operator Friendly Name | 3 |
| WAN Metrics | 4 |
| Connection Capability | 5 |

| Element Name | Subtype Value |
| --- | --- |
| NAI Home Realm Query | 6 |
| Operating Class Indication | 7 |
| Reserved | 8-255 |

A new subtype numbered 7 is defined within the Passpoint Certified™ ANQP element.

Thus, in order to determine the frequency bands supported by the AP, the STA makes a GAS/ANQP request to the Multi-band AP containing the subtype 'Operating Class Indication. In response to this ANQP Query for operating Class Indication, the Multi-band AP sends a GAS/ANQP response which contains information about the operating class of the multi-band AP. The ANQP response has the same format as described above, with an appropriate payload. The format of the payload is shown below, with the length (in octets) of each part of the payload underneath.

| | Operating Class Indication #1 (optional) | ... | Operating Class Indication #n (optional) |
| --- | --- | --- | --- |
| Octets: | 1 | ... | 1 |

The Operating Class Indication element provides information on the groups of channels in the frequency band or frequency bands that the Multi-band AP uses. In other words, this element reports the operating classes of APs in the same ESS as the AP transmitting this element. An STA supporting more than one frequency band (for example, 2.4 GHz and 5 GHz) may use this element for Basic Services Set (BSS) selection purposes.

This element allows APs supporting more than one frequency band to advertise itself only on one of its supported frequency bands. It also circumvents the need for multi-band supported STAs to search all frequency bands and the need to perform ANQP pre-associations per frequency band.

The Operating Class Indication field indicates the Operating Class. The indicator used comes from the values defined in Annex E of IEEE Draft P802.11-REVmb-D12.0, Part 11: Wireless LAN Medium Access Control (MAC) and Physical Layer (PHY) Specifications, November 2011. The STA can then choose one of these operating classes for accessing the Multi-band AP and for operation after association.

Thus, an AP can provide a list of supported bands in response to a GAS/ANQP query from the STA. However, it is also desirable for the signalling to indicate a preferred band. The possibility to signal a preferred band allows the AP to steer multi-band STAs towards a specific band. This can be useful for load balancing and operational and maintenance purposes. Moreover, the signalling of multi-band support can be further optimised.

In order to implement a preferred band signalling and optimise the signalling on supported band combinations, the STA can transmit a GAS/ANQP query for the preferred band of operation. This can be implemented by adjusting the Subtype Value for each Passpoint Certified™ ANQP Element, as shown in the following table.

| Element Name | Subtype Value |
| --- | --- |
| Reserved | 0 |
| HS Query list | 1 |
| HS Capability list | 2 |
| Operator Friendly Name | 3 |
| WAN Metrics | 4 |
| Connection Capability | 5 |
| NAI Home Realm Query | 6 |
| Operating Class Indication | 7 |
| Operating band | 8 |
| Reserved | 9-255 |

In response to the Operating band Query (Subtype 8), the AP provides a GAS/ANQP response with an Passpoint Certified™ ANQP element containing the payload 'Operating band'. The format of the Operating Band payload is shown below, with the length (in bits) of each part of the payload above.

| Bits: | B0-B2 | B3-B7 |
| --- | --- | --- |
| | Preferred Band | Band Combination |

The Preferred Band subfield indicates the frequency band for the STA to operate after ANQP pre-association. The value of the Preferred Band subfield is set to one of the values in the table below. In case the AP supports MIMO across different frequency bands, it may indicate the Preferred Band subfield as 'None'.

| Meaning | Value |
| --- | --- |
| None | 0 |
| 2.4 GHz | 1 |
| 5 GHz | 2 |
| Reserved | 3 ... 7 |

The Band Combination subfield informs the STA of the frequency bands supported by the AP. This is set to one of the values shown in the following table.

| Operating band supported by AP | Value |
| --- | --- |
| 2.4 GHz | 0 |
| 5 GHz | 1 |
| 2.4 GHz, 5 GHz | 2 |
| Reserved | 3 ... 31 |

The reserved values in Table 3 and Table 4 allow for future bands such as 60 GHz and TV White Space to be specified.

Although an embodiment of the invention has been described above, the skilled person will recognise that various modifications or adjustments can be made. For example, the specific formats of the ANQP element may change and the skilled person may further appreciate that extensions of GAS and ANQP or protocols with similar effect to GAS and/or ANQP might be used. It is additionally or alternatively possible for the AP to signal a priority list or ranking of the operating bands. This can be effected by listing the bands in order of priority when providing the response or by providing an additional data item that can be sent with the list of bands either automatically or as an option, or transmitted in response to a separate request from the STA.

Also, the supported frequency bands (operating classes) and preferred frequency bands can be indicated using different formats. For example, the table below shows an alternative format for operating bands, with an 8-bit length rather than a 4 bit length. The skilled person will also conceive alternative formats, and those in which the operating classes or operating bands are sent separately from the preferred band.

| Operating band supported by AP | Value |
|---|---|
| 2.4 GHz | 0 |
| 5 GHz (all sub-bands) | 1 |
| 5490-5719 MHz | 2 |
| 5490-5719 MHz | 3 |
| 5735-5835 MHz | 4 |
| 5170-5330 MHz, 5490-5719 MHz | 5 |
| 5170-5330 MHz, 5735-5835 MHz | 6 |
| 5490-5719 MHz, 5735-5835 MHz | 7 |
| 2.4 GHz, 5 GHz (all subbands) | 8 |
| 2.4 GHz, 5170-5330 MHz | 9 |
| 2.4 GHz, 5490-5719 MHz | 10 |
| 2.4 GHz, 5735-5835 MHz | 11 |
| 2.4 GHz, 5170-5330 MHz, 5490-5719 MHz | 12 |
| 2.4 GHz, 5170-5330 MHz, 5735-5835 MHz | 13 |
| 2.4 GHz, 5490-5719 MHz, 5735-5835 MHz | 14 |
| Reserved | 15 . . . 255 |

Possible applications of the invention can now be considered. For example, it may be used in conjunction with video or high priority services. Data traffic is initiated using 5 GHz between an AP and a wireless station because the expected performances are better. But a new video service delivery is required between the AP and the STA. The quality of service of this video traffic is affected by contention.

To solve the problem, the AP should be able to switch data traffic between AP and STA connected in 5 GHz to the 2.4 GHz, to free the 5 GHz channel for video. The invention might be used to implement this.

Another example concerns load balancing between frequency bands. A station wishes to join the AP. The 2.4 GHz or 5 GHz bands are suitable in term of Received Signal Strength Indication (RSSI). In a first scenario, several stations are already connected on one band (2.4 or 5 GHz). Thus, the AP can take the decision to connect a new station on the less crowded band or moves an existing station on to the less congested band. In a second scenario, the AP wants to reserve one band for a dedicated service that requires eligibility. The AP may take the decision to indicate the appropriate band to recommend the STA to connect.

These desideratum can be achieved in either scenario using the following procedure. Where the STA has not associated with the AP and the STA and AP both support the Passpoint Certified™ ANQP GAS protocol, the AP can indicate the preferred band for the STA to connect in the ANQP message. The AP Controller will have visibility of the load on the AP per frequency band and can use this information to determine the least loaded frequency band.

Providing an exact channel frequency may not be practical or optimal, because the AP Controller may not know the exact location of the STA and the APs closest to the STA. However, APs may be able to assess the interference on channels which are part of the advertised frequency band, in order to decide on which channel to operate for those bands. If the AP has information on the channel on which it is operating, it can transmit that to the wireless device to speed up access further. It should be noted that single-band STAs can ignore the preferred band indicated by the AP and it will not be prevented from associating with the AP in a band different to the one preferred by the AP. Nevertheless, it is expected that STAs supporting more than one band should follow the AP's preferred band. This might be mandatory in some cases.

A second example relates to load balancing per service stream between bands. Here, a station wishes to join the AP. It has a video traffic stream and a data traffic stream. For multiple streams on various STAs, the AT wants to reserve 5 GHz for video and 2.4 GHz for data. The AP can then switch the video stream to use 5 GHz and the data traffic can be streamed using 2.4 GHz.

A third example concerns interference on the 2.4 GHz band. A jammer (for example, an alarm transmitter) is detected and there are no more channels available. Then, the AP may switch its traffic from 2.4 GHz to 5 GHz. This scenario may not be applicable for public Wi-Fi access due to the reliance on 2.4 GHz as the popular band used by many mobile devices.

A fourth example deals with interference in 5 GHz. Regulations that apply to the 5 GHz band in most domains require Wi-Fi access networks operating in this band to implement a mechanism to avoid co-channel operation with radar systems and to ensure uniform utilization of available channels. When radar is detected on a channel, or if there are other services (that is non-radar) already operating on the Wi-Fi allocated band or channel, which are not to be used by the STA, the following steps can be taken.

Where an STA is already associated with the AP, the AP moves the associated STA to another channel in the 5 GHz band. Were the STA is not yet associated with the AP and both support the Passpoint Certified™ ANQP GAS protocol, the AP can indicate the preferred band and frequency range within the band to the STA in the ANQP message.

The objectives of this band-steering include, but are not limited to: (i) for load balancing; (ii) segregate device/usage type to specific bands; and (iii) to ensure Passpoint Certified™ access can be charged (difficult to justify charging users if all mobile devices are charged the same for using a Passpoint Certified™ AP and a non-Passpoint Certified™ AP).

The AP can therefore use the following one or more of the following factors to steer the STA to a desired band: (i) the current load on the AP Controller per AP per band; (ii) the number of available channels managed by the AP controller (taking into consideration operating restriction, interference, etc); and (iii) traffic and/or usage type per AP per band.

Thus, the invention may have the following advantages. It may allow the STA to automatically switch frequency band. For a simpler user experience, a behaviour as simple as provided using cellular systems may be targeted. When a user is connected on a GSM or 3G network, for example, the user will not know the frequency band being used. This is managed by the operator. To be efficient and provide an improved user experience, the inter band switching during communication is desirably transparent for users, being automatic, without any user action. Also, the security implementations that are currently frequency band-specific may be extended across bands, using a single key. In other words, the re-association procedure is improved.

To increase efficiency provided by multiple band, multi-band contention and interferences management in the AP, load balancing per user and per stream is desirable. This is assisted by switching sessions, based on a decision from the AP. For example, high priority services and/or video may be provided only using 5 GHz and other data using 2.4 GHz. This band reservation may be implemented by switching traffic initiated in the wrong band, just after authentication To implement this, the wireless device advantageously supports and control automatic transition between or across Wi-Fi spectral bands. Additional capabilities may be provided to enable service selection or invocation related to band selection (for example, quality of service or video). Also, APs may have the capability to enforce or enable band transition and channel selection.

The invention claimed is:

1. A Wireless Local Area Network, WLAN, access point, supporting access using one or more frequency bands, the WLAN access point being configured to receive a query from a wireless device using one of the one or more frequency bands prior to association of the wireless device with the WLAN access point and to transmit to the wireless device an indication of the one or more frequency bands in response to the query;
characterized in that the WLAN access point is further configured to transmit a priority indication, indicative of at least one preferred frequency band from the one or more frequency bands used for supporting access.

2. The WLAN access point of claim 1, further configured to transmit a beacon on each of the one or more frequency bands used for supporting access.

3. The WLAN access point of claim 1, wherein the priority indication is further indicative of a ranking for at least some of the one or more frequency bands, the ranking identifying the relative preferred status for accessing the access point using the respective frequency band.

4. The WLAN access point of claim 1, further configured to determine the priority indication on the basis of an operational characteristic of the WLAN access point.

5. The WLAN access point of claim 4, wherein the operational characteristic comprises a load upon the WLAN access point.

6. The WLAN access point of claim 4, wherein the operational characteristic comprises a detected interference level in respect of the one or more frequency bands used for supporting access.

7. The WLAN access point of claim 1, further configured to determine the priority indication on the basis of a characteristic of the wireless device from which the query is received.

8. The WLAN access point of claim 1, wherein the WLAN access point is configured to transmit the priority indication in response to a second query from the wireless device requesting a priority indication.

9. The WLAN access point of claim 1, wherein the indication of the one or more frequency bands used for supporting access comprises a plurality of indicators, each indicator identifying a respective one of the one or more frequency bands used for supporting access.

10. A Wireless Local Area Network, WLAN, device, configured to transmit a query to a WLAN access point prior to association of the WLAN device with the WLAN access point, the query requesting an indication of one or more frequency bands used by the WLAN access point to support access;
characterized in that the WLAN device is further configured to receive a priority indication from the WLAN access point, the priority indication being indicative of at least one preferred frequency band from the one or more frequency bands used by the WLAN access point for supporting access.

11. The WLAN device of claim 10, further configured to receive a beacon from the WLAN access point using a first frequency band, the query being transmitted using the first frequency band, subsequent to reception of the beacon.

12. The WLAN device of claim 10, further configured to select a frequency band based on the received priority indication and to initiate access to the WLAN access point using the selected frequency band.

13. A method of operating a Wireless Local Area Network, WLAN, access point, supporting access using one or more frequency bands, the method comprising:
receiving a query from a wireless device using one of the one or more frequency bands prior to association of the wireless device with the WLAN access point;
transmitting to the wireless device an indication of the one or more frequency bands in response to the query; and
transmitting a priority indication to the wireless device, the priority indication being indicative of at least one preferred frequency band from the one or more frequency bands used for supporting access.

14. A computer program, configured to carry out the method of claim 13 when operated by a processor.

* * * * *